Figure 3:
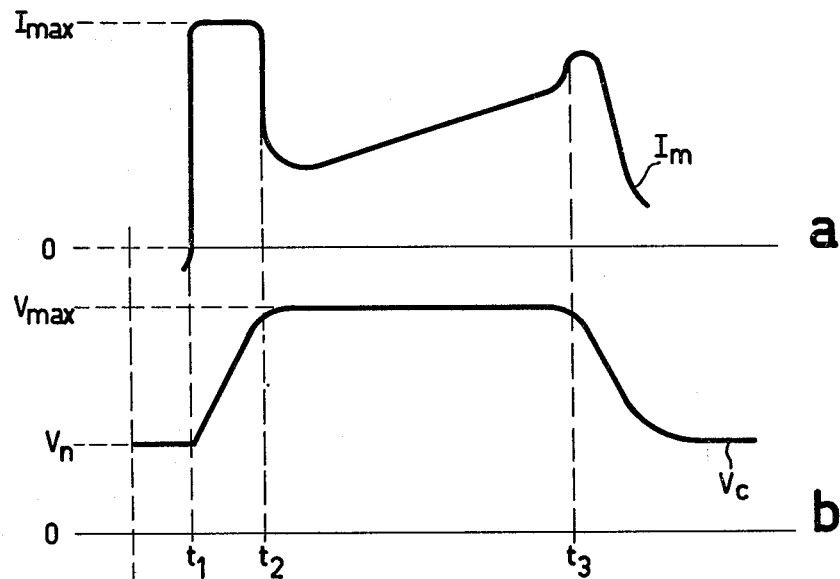

United States Patent [19]

Rosink et al.

[11] 4,227,139
[45] Oct. 7, 1980

[54] MOTOR CONTROL ARRANGEMENT

[75] Inventors: Wilhelmus B. Rosink; Cornelus P. J. Cox, both of Eindhoven, Netherlands

[73] Assignee: U.S. Philips Corporation, New York, N.Y.

[21] Appl. No.: 905,225

[22] Filed: May 12, 1978

[30] Foreign Application Priority Data

Jun. 20, 1977 [NL] Netherlands ................. 7706751

[51] Int. Cl.² ............................................. H02P 5/40
[52] U.S. Cl. .................................... 318/803; 318/811
[58] Field of Search ............................. 318/798–803, 318/807, 810, 811

[56] References Cited

U.S. PATENT DOCUMENTS

| | | | |
|---|---|---|---|
| 3,819,992 | 6/1974 | Opal et al. | 318/798 |
| 3,919,609 | 11/1975 | Klautschek et al. | 318/803 |
| 4,158,163 | 6/1979 | Eriksen et al. | 318/798 |

*Primary Examiner*—Gene Z. Rubinson
*Attorney, Agent, or Firm*—Thomas A. Briody; William J. Streeter; Bernard Franzblau

[57] ABSTRACT

A motor control circuit for an a.c. motor which is energized via power switches by a direct voltage obtained from an alternating voltage mains via rectifiers and a smoothing capacitor. A frequency reference signal is applied to a circuit which controls the power switches via a first amplifier with output signal limitation in series with an integrator, whose output provides feedback to the input of the first amplifier. A negative current-feedback loop with a motor current detector, whose output signal is compared with the reference signal in a comparator, acts at a point between the amplifier and the integrator in order to close the negative feedback loop when the motor current exceeds a predetermined value. A negative voltage-feedback loop with a detector for the direct voltage obtained from the a.c. mains, the output signal of said detector being compared with a reference signal, also acts at the point between the amplifier and integrator in order to close said negative voltage-feedback loop when said direct voltage exceeds a predetermined value.

8 Claims, 10 Drawing Figures

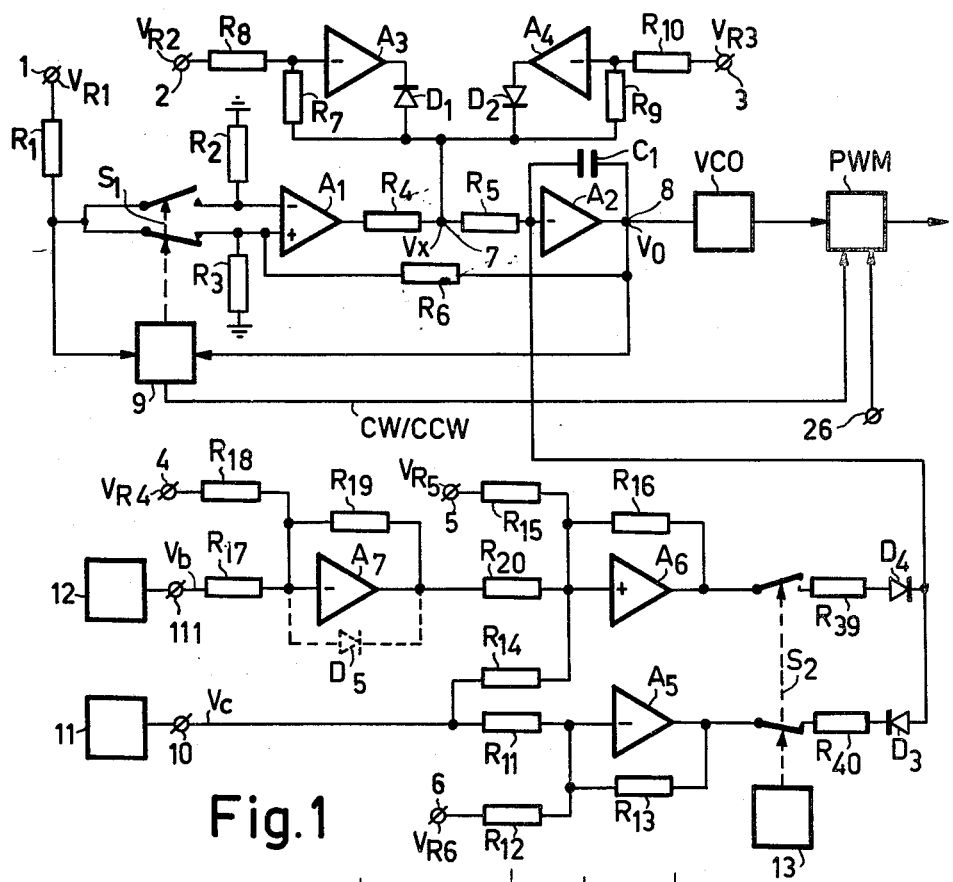
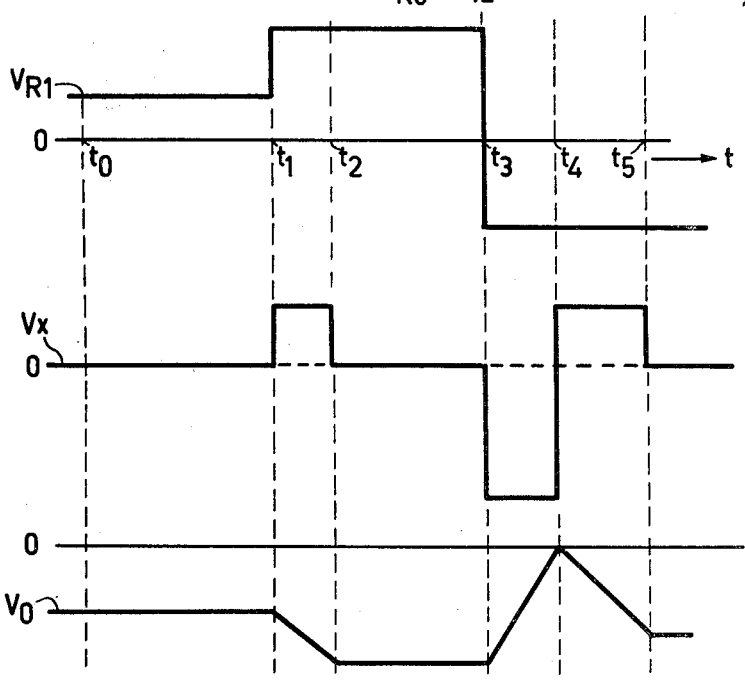
Fig.1
Fig.2a
Fig.2b
Fig.2c

MOTOR CONTROL ARRANGEMENT

The invention relates to a motor control arrangement for an a.c. motor which is energized from a direct voltage source via power switches. The arrangement comprises a frequency control circuit and the direct voltage source comprises a rectifier for rectifying an a.c. supply voltage and a smoothing circuit. The frequency control circuit comprises a frequency reference signal input which is connected to an input of a first amplifier with output signal limitation. An output of said first amplifier is connected to an input of a first integrator having an output which supplies a frequency control signal to a circuit which controls the power switches and provides feedback to the input of the first amplifier.

Such a motor control arrangement comprising an amplifier and an integrator with feedback is known from the published German Patent Specification No. 26 20 321 and is particularly suitable for supplying frequency control signals, the integrator in conjunction with the limiting amplifier and the feedback determining the rate of change of the frequency control signal. The circuit described in the U.S. Pat. No. 4,189,699 serves for generating pulse-width modulated signals for controlling the power switches, the motor-current frequency being determined by the frequency of the input clock signal via this circuit. The circuit is highly suitable for use in conjunction with said known arrangement. This clock signal can then be generated with a clock generator which is controlled by said frequency control signal.

The said combination of circuits provides a cheap, reliable and simple motor control circuit. However, in order to derive the full benefit from these advantages, the various protection facilities and negative feedback loops should also be simple and reliable.

One of the situations to be protected is braking of the motor. If during braking of the motor the motor speed dictated by the frequency control circuit drops below the actual motor speed, the motor will start to operate as a generator. Maximum braking is then possible if the energy thus released can be fed back to the power supply. However, this demands complicated and expensive power supplies. For example, in the case of a motor which is energized from the a.c. supply via a simple rectifier bridge, feedback of the energy which is being released is not possible and the available energy will have to be dissipated in the motor, the power switches and the control circuit. In order to protect the circuit it is known from U.S. Pat. No. 3,719,873 to detect the motor current and, once said current reaches a predetermined level, to change the frequency control signal so as to obtain a substantial reduction of the motor current. It is obvious that said predetermined level should not exceed the current which flows when the motor and the circuits dissipate the maximum permissible energy under the most unfavourable conditions. It follows that the motor requires a comparatively long braking time. Moreover, such a protection scheme has the drawback that the operating conditions must be known in advance in order to enable an optimum circuit to be designed and manufactured.

It is an object of the invention to provide a motor control arrangement of the type mentioned in the preamble which, by simple means, provides a reliable protection in the case of generator operation, while optimum braking of the motor can be achieved regardless of the load and speed of the motor, i.e. a braking speed which is not limited by the most unfavourable conditions.

For this, the invention is characterized in that the motor control arrangement further comprises a negative current-feedback loop, comprising first means for generating a motor current signal which is a measure of the current flowing in the motor and a first comparator for comparing said motor current signal with a reference signal. An output of said first comparator is connected to the input of the integrator so that as soon as the motor current exceeds a predetermined value the negative current-feedback loop is closed via the first comparator and the integrator. The invention also includes a negative voltage-feedback loop comprising second means for generating a voltage signal which is a measure of the voltage across the direct voltage source, and a second comparator for comparing said voltage signal with a reference signal. An output of said second comparator is coupled to the integrator so that as soon as the voltage across the direct voltage source exceeds a predetermined value, the negative voltage-feedback loop is closed via the second comparator and the integrator.

The invention is based on the recognition that the use of a negative voltage-feedback loop in addition to a negative current-feedback loop not only provides protection against excess voltages but, which is far more interesting, makes possible very fast braking because always and under all conditions a maximum energy is dissipated. This may be explained as follows. At the onset of braking the generated motor currents rapidly rise to a high maximum value. As the energy which is fed back cannot be delivered to the a.c. supply, the voltage across the direct voltage supply increases very rapidly to a maximum permissible value owing to the capacitances, generally buffer capacitors, being charged, which value may be twice the nominal value and is determined by the electronic components which are used, such as diodes and thyristors. The negative voltage-feedback loop limits this voltage to said value, as a result of which the current decreases. As long as the braking motor supplies sufficient energy the supply voltage will remain at said maximum value and the current will be adapted thereto and to the speed, so that during substantially the entire braking process the dissipation of the energy which is released is a maximum. A significant point which is thus gained is that at voltages which are substantially higher than the nominal voltages most motors become saturated, so that the dissipation in the motor itself increases considerably.

If solely an excess-current protection, as for example is known from the said U.S. Pat. No. 3,711,873, or a current limitation were used, the limit value of the motor current would have to be selected so that only under the most unfavourable conditions the maximum permissible supply voltage can be reached. This means that said current limit will be substantially lower than that which can be selected in the case of a control technique in accordance with the present invention, and that on the average the supply voltage will be much lower, which not only reduces the dissipation but also eliminates said advantage of the motor becoming saturated, so that a substantially longer time is needed for the motor to brake safely.

With a motor control arrangement in accordance with the invention it is advantageous that the output of the second comparator be connected to the first integrator via the first comparator so that when the negative voltage-feedback loop is closed the negative current-feedback loop is also closed.

As in addition to the said integrator the capacitance of the direct voltage source also constitutes an integrator, the negative voltage-feedback loop in fact comprises two integrators in series, which may give rise to stability problems. As in the last-mentioned motor control arrangement the negative voltage-feedback loop acts in the highly stable negative current-feedback loop said stability problems do not occur. Even if the motor current has not reached said predetermined value, this negative current-feedback loop is still activated so as to limit the voltage across the direct voltage source to a predetermined value.

An advantageous embodiment of an arrangement in accordance with the invention is characterized in that the motor control arrangement further comprises detection means for detecting whether the a.c. motor operates as a generator or as a motor, a third comparator of which has an input which leads to said first signal generating means. In addition switching means are coupled between an output of the third comparator and the input of the first integrator and between the output of the first comparator and the input of the first integrator. The switching means are controlled by said detection means in such a way that during generator operation the output of the first comparator is connected to the integrator, and during motor operation the output of the third comparator is connected to the integrator.

In this way the limitation acts separately for motor and for generator operation. The negative voltage-feedback loop can be closed only when the motor operates as a generator and, moreover, the limit values of the motor current during motor and generator operation may be selected differently.

In respect of the said detection means for detecting the voltage across the direct voltage source, it is advantageous that the detection means comprises a second rectifier with a smoothing circuit and a comparator for comparing the direct voltage obtained by means of the second rectifier with the voltage of said direct voltage source and supplying a signal which indicates whether the voltage of the direct voltage source exceeds or does not exceed by a predetermined value the direct voltage obtained via the second rectifier.

Thus, it is ensured that the detection of generator operation is not affected by supply voltage variations.

The said means for detection of the motor current may be characterized in that said first signal generating means in each phase supply line of the a.c. motor comprise a rectifying d.c. transformer whose secondary windings are connected in parallel and supply said motor current signal via a smoothing filter.

In respect of the power supply of the frequency control circuit it is advantageous to connect in parallel which the direct voltage source a switched direct voltage converter that includes a transformer. The transformer primary is connected in series circuit with a switch. The series circuit is connected in parallel with the direct voltage source. A first secondary winding of the transformer is coupled to a rectifier circuit for supplying a supply voltage to the frequency control circuit. This yields the significant advantage that the frequency control circuit remains energized as long as there is sufficient voltage across the direct voltage source, even if the motor control circuit has been disconnected from the a.c. supply or if the a.c. supply fails. If the frequency control circuit were energized via an independent supply circuit, the control circuitry would fail in the event of a supply voltage failure, while some power switches were still conductive and would remain conductive owing to the control failure. As a result the direct voltage supply would be short-circuited which, without the use of additional protection, would have an adverse effect on the power switches and the power supply circuit.

When a switched direct voltage converter is used, it is advantageous that said second signal generating means comprise a second secondary winding of the transformer, which second secondary winding is connected to a rectifier circuit for supplying said voltage signal.

This voltage signal can moreover be used to advantage in that said second signal generating means are connected to a fourth comparator for comparing said voltage signal with a reference signal, an output of said fourth comparator being coupled to a switch which is included between the rectifier of the direct voltage source and the smoothing circuit of the direct voltage source for closing said switch when the voltage signal exceeds said reference signal. The said switch is connected in parallel with a resistor with a positive temperature coefficient.

In the case of energization from a low ohmic a.c. supply the buffer capacitor in the direct voltage source will be charged with a large charging current upon switching on. This charging current is limited by said resistor, which is short-circuited by the switch when the voltage of the direct voltage source is sufficiently high. By selecting a resistor with a positive temperature coefficient for said resistor, the resistance value of said resistor may be selected comparatively low. Said resistor will still provide protection against short-circuits because, as a result of the large currents during a short-circuit, the resistor becomes warmer and consequently the resistance value increases so that the power dissipation in this resistor remains limited.

Figure 4:
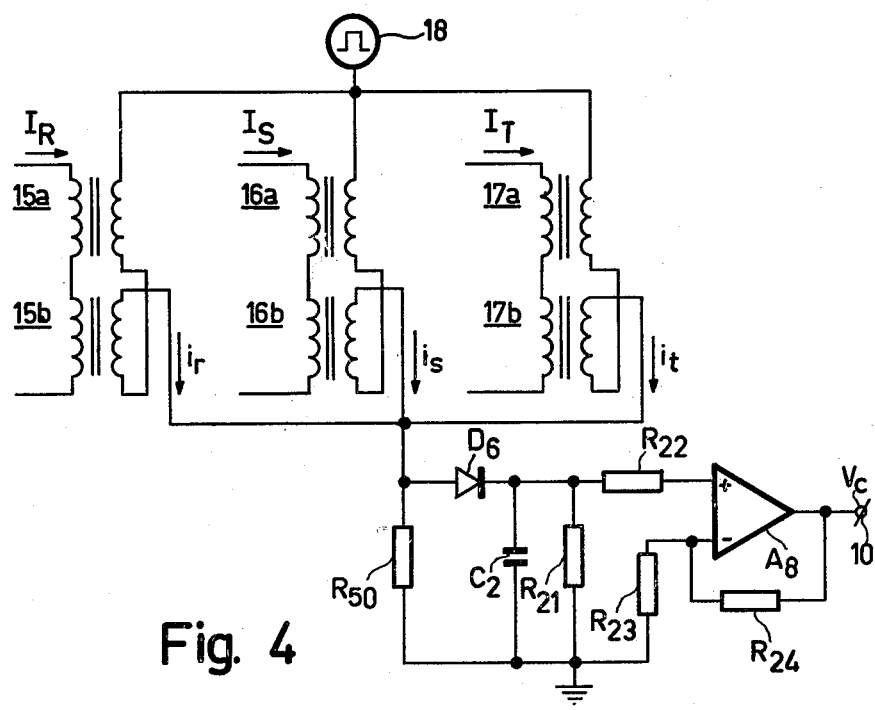
Figure 5:
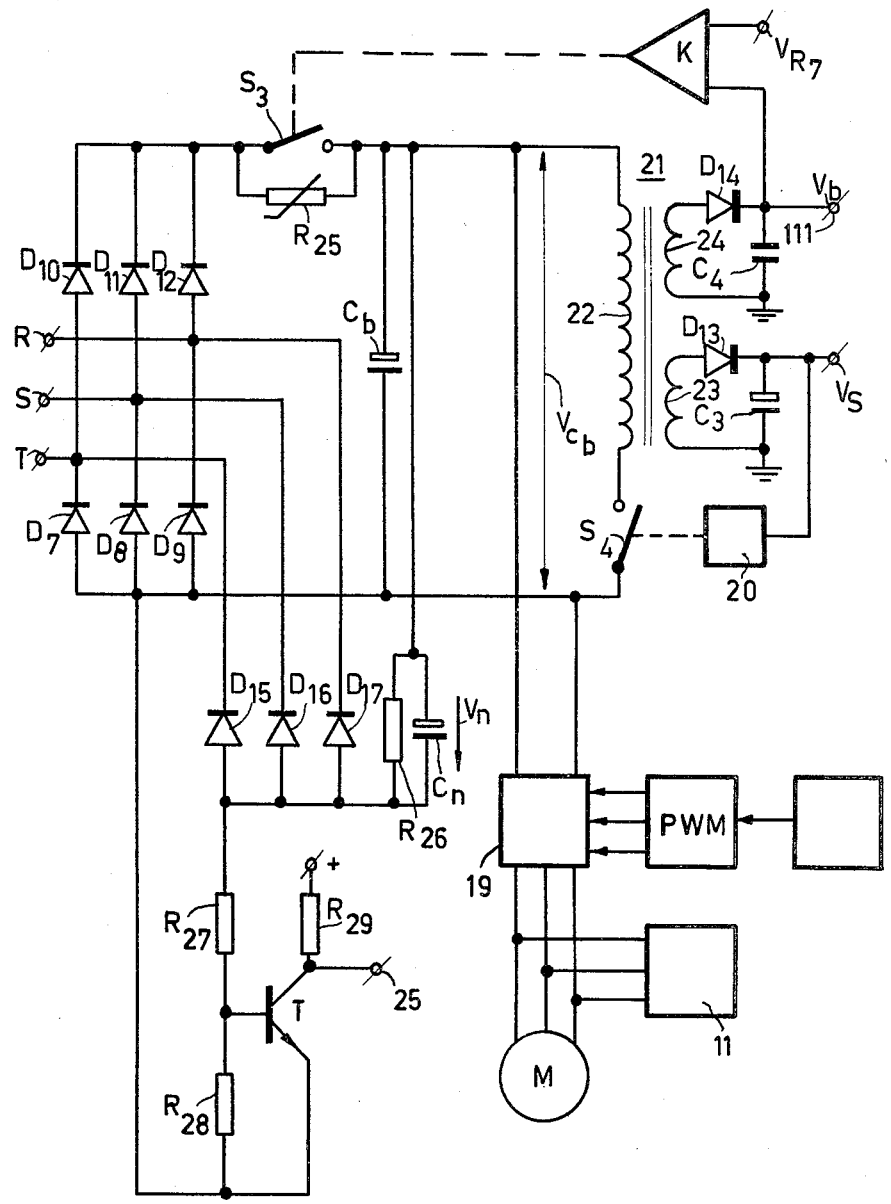
Figure 6:
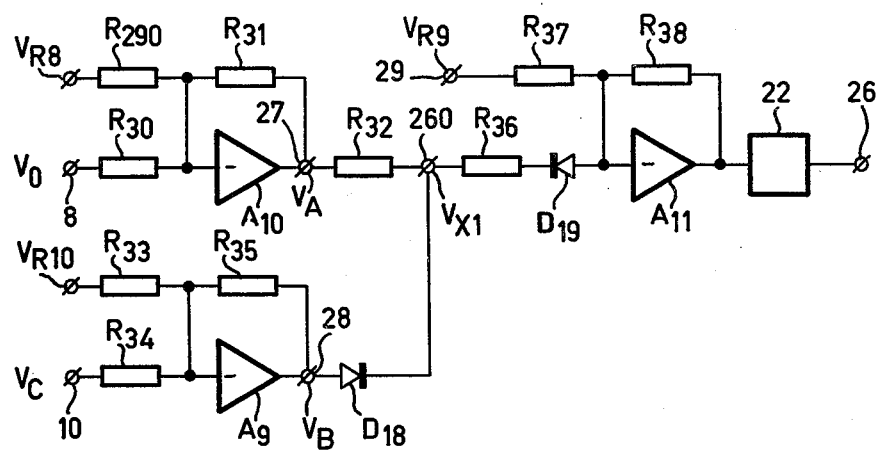
Figure 7:
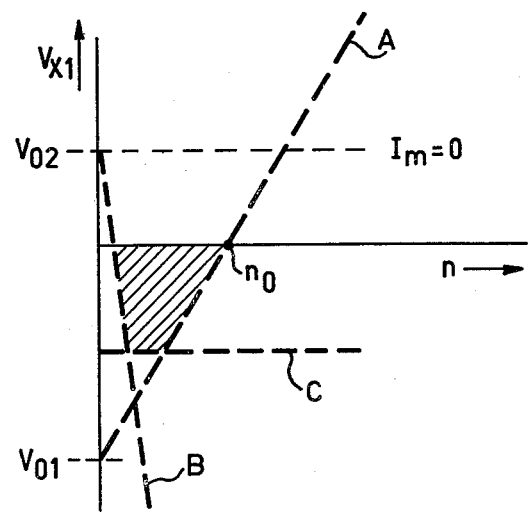

The invention will now be described in more detail with reference to the drawing, in which:

FIG. 1 shows an example of a frequency control circuit for a motor control arrangement in accordance with the invention, FIGS. 2a, 2b and 2c show some signal waveforms in illustration of the operation of the circuit in accordance with FIG. 1, FIGS. 3a, 3b schematically show a possible variation of the amplitude of the motor current and the voltage across the direct voltage supply as a function of time, when the motor starts to operate as a generator during braking, FIG. 4 shows an example of the motor current detector 11 of FIG. 1, FIG. 5 shows an example of a direct voltage source for energizing a motor via power switches, FIG. 6 shows a circuit for generating an IR compensation signal, and FIG. 7 shows a diagram in explanation of the operation of the circuit in accordance with FIG. 6.

FIG. 1 shows an example of a frequency control circuit for a motor control arrangement in accordance with the invention. This circuit has a frequency reference signal input 1 to which a voltage $V_{R1}$ is applied. This input 1 leads to the inverting ($-$) or non-inverting ($+$) input of an operational amplifier $A_1$ via a gain control resistor $R_1$ and change-over switch $S_1$. Both inputs are provided with grounding resistors $R_2$ and $R_3$ respectively. The output of amplifier $A_1$ leads to the inverting input of an operational amplifier $A_2$ via the series connection of resistors $R_4$ and $R_5$, which amplifier is connected as an integrator in that the output 8 of said operational amplifier is connected to said input via a capacitor $C_1$. The output 8 of the integrator $A_2$ is connected to the non-inverting input of operational amplifiers $A_1$ via resistor $R_6$ so as to obtain negative feedback and to a voltage controlled oscillator VCO. The oscillator supplies a clock signal to a pulse width modulation circuit PWM for generating pulses for switching power switches, as is for example described in the said U.S. Pat. No. 4,189,669. The junction point 7 between the resistors $R_4$ and $R_5$ is connected to the output of an operational amplifier $A_3$ via the anode-cathode path of a diode $D_1$, which operational amplifier has gain control resistors $R_7$ and $R_8$ and an inverting input connected to a point 2 at a reference potential $V_{R2}$, and via the cathode-anode path of a diode $D_2$ to the output of an operational amplifier $A_4$ having gain control resistors $R_9$ and $R_{10}$. The inverting input of said amplifier $A_4$ is coupled to a point 3 at a reference potential $V_{R3}$. Furthermore, the circuit in accordance with FIG. 1 includes a circuit 9 for actuating the switches $S_1$. The circuit 9 receives the voltage $V_o$ at the output 8 of the integrator and the reference voltage $V_{R1}$ as input signals in order to change over the switch $S_1$ at the instant that the voltage $V_o$ becomes zero volts when the polarity of the voltage $V_{R1}$ has changed. The shown position of the switch $S_1$ corresponds to a positive voltage $V_{R1}$ in the stationary condition and the other position to a negative voltage $V_{R1}$.

In order to illustrate the operation of the previously described part of the circuit in accordance with FIG. 1, FIG. 2a shows a frequency control signal $V_{R1}$, chosen by way of example, as a function of time and FIGS. 2b and 2c show the voltages $V_x$ and $V_o$ in response to the voltage $V_{R1}$.

At the instant $t_1$ the speed is assumed to be constant. The switch $S_1$ then is in the position shown and the voltage $V_{R1}$ is positive. Via voltage divider $R_1$, $R_3$ this voltage $V_{R1}$ is applied to the non-inverting input of the amplifier $A_1$, to which moreover the output voltage of integrator $A_2$ is applied via the voltage divider $R_6$, $R_3$. The output voltage of amplifier $A_1$ has charged capacitor $C_1$ in such a way that the resulting input difference voltage of the amplifier $A_1$ and thus the output voltage $V_x$ at point 7 is zero volts. The output voltage $V_o$ at the integrator, which is a measure of the required speed of the motor, is consequently determined by the voltage $V_{R1}$ and is always negative in the present example.

At the instant $t_1$ a higher speed is demanded in that the voltage $V_{R1}$ assumes a higher value. As a result of this, the output voltage $V_x$ assumes a positive value which via diode $D_1$ is limited by the output voltage of operational amplifier $A_3$, which output voltage is determined by the reference voltage $V_{R2}$ and the values of the resistors $R_7$ and $R_8$. Owing to this voltage transient capacitor $C_1$ is charged and the voltage $V_o$ decreases until at the instant $t_2$ it corresponds to the new value of the voltage $V_{R1}$ and the voltage $V_x$ again has become zero volts. The rate at which the voltage $V_o$ decreases (acceleration of the motor) can be adjusted by means of the reference voltage $V_{R2}$.

At the instant $t_3$ a reversal of the direction of rotation of the motor is ordered by bringing the voltage $V_{R1}$ to a negative value. As a result of this, the voltage $V_x$ obtains a negative value which via diode $D_2$ is limited by the output voltage of operational amplifier $A_4$, which output voltage is determined by the reference voltage $V_{R3}$ and the values of the resistors $R_9$ and $R_{10}$. Owing to this voltage transient capacitor $C_1$ is discharged and the voltage $V_o$ increases (the deceleration of the motor) at a rate which can be adjusted by means of the reference voltage $V_{R3}$. At the instant $t_4$ the voltage $V_o$ has become zero volts, which means that the output frequency of the oscillator VCO has become zero. This is detected by the circuit 9 and because the polarity of the voltage $V_{R1}$ is no longer in conformity with the position of the switch $S_1$, said switch is changed over to the other position.

Moreover, a signal CW/CCW is applied to the circuit PWM in order to reverse the direction of rotation via logic circuits. In order to accelerate the motor in the reverse direction of rotation the voltage $V_o$ should decrease again. This is achieved by changing over the switch $S_1$ so that the voltage $V_{R1}$ is applied to the inverting input of amplifier $A_1$. As a result, the voltage $V_x$ becomes equal to the positive limit value and the voltage $V_o$ decreases until at the instant $t_5$ it corresponds again to the (negative) value of the voltage $V_{R1}$ and the voltage $V_x$ is zero volts.

The circuit in accordance with FIG. 1 further comprises a negative current-feedback loop. This loop comprises a circuit 11 for measuring motor current and generating at an output 10 a voltage $V_c$ which is a measure of the absolute value of the motor current and which in the present example is positive. This voltage $V_c$ is added to a negative reference voltage $V_{R6}$ via resistors $R_{11}$ and $R_{12}$ and applied to the inverting input of an operational amplifier $A_5$ with a gain control resistor $R_{13}$. The output of the operational amplifier $A_5$ leads to the input of the amplifier $A_2$ via a double switch $S_2$, which is controlled by a circuit 13, and via a resistor $R_{40}$ and the cathode-anode path of a diode $D_3$, the input of said amplifier $A_2$ constituting a virtual ground. Similarly, the voltage $V_c$ is added to a reference voltage $V_{R5}$ via resistors $R_{14}$ and $R_{15}$ and applied to the non-inverting output of an operational amplifier $A_6$ with a gain control resistor $R_{16}$. The output of this operational amplifier leads to the input of the operational amplifier $A_2$ via switch $S_2$, resistor $R_{39}$, and the anode-cathode path of a diode $D_4$.

The circuit 13 detects whether the motor operates in the generator or in the motor range and controls switch $S_2$ in such a way that the switch is in the position shown during motor operation and in the other position during generator operation.

If during motor operation the motor current is zero, the input of operational amplifier $A_5$ is at a negative value which is determined by the reference voltage $V_{R6}$ and the output voltage of the operational amplifier $A_5$ is positive, so that diode $D_3$ is cut off. If the motor current and thus the voltage $V_c$ increases, the output voltage of the operational amplifier will decrease and, if the motor current exceeds a value to be adjusted by the reference voltage $V_{R6}$, it will become negative so that diode $D_3$ is turned on and the capacitor $C_1$ will discharge. This results in an increase of the voltage $V_o$ and thus a deceleration of the motor so that the motor current decreases. As the negative current-feedback is applied via resistors $R_{39}$ and $R_{40}$ with a value which is smaller than the resistance value of resistor $R_5$, via which frequency control is effected, the negative current-feedback will be dominant if there is a positive voltage $V_x$.

During generator operation switch $S_2$ is in the opposite position and the negative current-feedback loop can be closed only via the operational amplifier $A_6$. If the motor current decreases during generator operation, the voltage $V_c$ will increase and the influence of the negative reference voltage $V_{R5}$ will be reduced so that the output voltage of operational amplifier $A_6$ will become less negative. Diode $D_4$ is then cut off. If the motor current exceeds a value to be adjusted by means of the reference voltage $V_{R5}$, the output voltage of operational amplifier $A_6$ becomes positive and diode $D_4$ is turned on so that the voltage $V_o$ at the output of the comparator decreases, which corresponds to a reduction of the braking action of the motor.

The circuit in accordance with FIG. 1 also comprises a negative voltage-feedback loop. The voltage across the direct voltage supply is detected with a circuit 12 and converted into a voltage $V_b$, which is negative in the present example. This voltage $V_b$ is added to the positive reference voltage $V_{R4}$ via resistors $R_{17}$ and $R_{18}$ and applied to the inverting input of an operational amplifier $A_7$ with a gain control resistor $R_{19}$. The output of amplifier $A_7$ leads to the input of operational amplifier $A_6$ via a resistor $R_{20}$.

If the voltage across the direct voltage supply exceeds a value which is determined by the reference voltage $V_{R4}$ the output voltage of operational amplifier $A_7$ becomes positive and influences the negative current-feedback via the operational amplifier $A_6$ during generator operation. This has the effect of a reduction of the reference voltage $V_{R5}$.

As described, the motor current is limited and the voltage of the direct voltage supply is limited. For this there is a range in which limitation is effected in response to a combination of two parameters, which range is inter alia determined by the relative values of the voltages $V_b$ and $V_c$, the gain of the operational amplifier $A_7$, and the ratio of the values of the resistors $R_{14}$ and $R_{20}$. There are several possibilities to ensure that this range is small, in other words that the negative voltage-feedback becomes very strong when a specific value of the voltage across the direct voltage source is exceeded, and not below this value. As an example, the gain of the operational amplifier $A_7$ may be selected very high, such that the amplifier $A_7$ is highly saturated at nominal voltages, and is not unsaturated until a specific value of said voltage is reached. Another possibility is the diode $D_5$, which is shown dotted in FIG. 1. If the input voltage of operational amplifier $A_7$ is positive, diode $D_5$ clamps the output voltage of amplifier $A_7$ at a voltage level of substantially zero volts. When the (negative) voltage $V_b$ has decreased to such an extent that the voltage of operational amplifier $A_7$ becomes negative and the output voltage becomes positive, diode $D_5$ cuts off and the voltage control can become operative.

FIGS. 3a and 3b schematically represent the variation of the amplitude of motor current $I_m$ and the voltage $V_{cb}$ of the direct voltage supply as a function of time when the motor starts to operate as a generator during braking. At the instant $t_1$ the motor supplies energy and the motor current charges the capacitances in the direct voltage supply in such a way that the voltage $V_{cb}$ increases from the nominal value $V_n$ until at the instant $t_2$ a maximum value $V_{max}$ is reached. Between the instants $t_1$ and $t_2$ the current $I_m$ is limited to a maximum value $I_{max}$. At the instant $t_2$ the negative voltage-feedback becomes operative and via the negative current-feedback loop it limits the motor current in such a way that the voltage $V_{cb}$ is limited at the value $V_{max}$. The motor current can then increase at decreasing speed. No more energy is stored in said capacitances and the motor plus the circuits associated therewith dissipate the energy which is delivered. This dissipation is high because the voltage is maximum, for example 2.5 times the nominal voltage, at which voltage the motor will generally be saturated so that the motor dissipates a lot of energy. At the instant $t_3$ the speed has decreased so far that the energy supplied by the motor no longer suffices to maintain the voltage $V_{cb}$ at a maximum. The voltage $V_{cb}$ decreases and the motor current $I_m$ may continue to increase.

FIG. 4 shows an example of the motor current detector 11 of FIG. 1 adapted for 3-phase alternating current measurement. The detector comprises six toroids $15a$ .. . $17b$ with high-permeability cores and a primary and a secondary winding, the ratio of the number of primary and secondary turns being for example 1:50. The primary windings of the toroids $15a$ and $15b$, $16a$ and $16a$ and $17a$ and $17b$, are each time connected in series and included in the motor current supply lines in which the currents $I_R$, $I_S$ and $I_T$ flow. The secondary windings are each time connected in antiseries, which antiseries connections are included in parallel between a pulse generator 18 and a resistor $R_{50}$. Parallel to the resistor $R_{50}$ a smoothing filter with a diode $D_6$, capacitor $C_2$ and a resistor $R_{21}$. The voltage across resistor $R_{21}$ is applied to the non-inverting input of an operational amplifier $A_8$ having biasing resistors $R_{22}$, $R_{23}$ and $R_{24}$. The output of said operational amplifier $A_8$ supplies the current signal $V_c$ to the output 10 of the motor current detector.

Owing to the high permeability of the core material of the toroids the cores will become saturated for certain values of the phase currents $I_R$, $I_S$ and $I_T$, which values should lie below the maximum value. As the pulse generator 18 applies high-frequency pulses across the secondary windings which are connected in antiseries, one of the two cores per phase always will be saturated further while the other will be unsaturated. The currents $i_r$, $i_s$ and $i_t$ in the secondary windings will then always be a measure of the absolute values of the phase currents $I_R$, $I_S$ and $I_T$ respectively. These currents $i_r$, $i_s$ and $i_t$ are added in the resistor $R_{50}$ and converted into a voltage, which is smoothed by the filter $D_6$, $C_2$, $R_{21}$ to a direct voltage which is a measure of the amplitude of the motor current. This smoothed voltage is amplified by the operational amplifier $A_8$ to derive the current signal $V_c$.

FIG. 5 shows an example of a direct voltage source for energizing a motor via power switches. This source comprises a connection for the 3-phase a.c. supply R, S and T, and a rectifier bridge including diodes $D_7$, $D_8$, $D_9$, $D_{10}$, $D_{11}$ and $D_{12}$. Via a switch $S_3$ the rectified voltage across these diodes is applied across a buffer capacitor $C_b$ for smoothing the rectified supply voltage. Via an inverter circuit 19 having power switches (not shown) the voltage $V_{cb}$ across said buffer capacitor is converted into a 3-phase alternating current whose frequency is controlled by the circuit PWM for energizing the motor M. These currents are detected with the previously described current detector 11. The circuit PWM receives a frequency control signal from a circuit as shown in FIG. 1.

Via a direct voltage converter the direct voltage $V_{cb}$ is converted into a lower direct voltage $V_s$ for supplying the various circuits. In principle, this convertor consists of a transformer 21 with a primary winding 22 across which the direct voltage $V_{cb}$ is available via a switch $S_4$ which is actuated by the oscillator 20. A secondary winding 23 of said transformer 21 is connected to a rectifier circuit including a diode $D_{13}$ and a capacitor $C_3$.

As the switch $S_4$ is switched on and off at a high frequency, the direct voltage $V_{cb}$ is converted into an alternating current which is transformed by transformer 21 and is rectified and smoothed by diode $D_{13}$ and capacitor $C_3$, yielding the direct voltage $V_s$. This direct voltage $V_s$ is fed back to the oscillator 20 in order to disable said oscillator as soon as the voltage $V_s$ across capacitor $C_3$ attains a predetermined value and to start the oscillator again when said voltage $V_s$ becomes too low. In this way a direct voltage $V_s$ is obtained which is highly independent of the voltage $V_{cb}$, which may for example vary between 80 and 800 V. Thus, it is achieved that for example in the event of a supply voltage failure the motor control circuit remains energized as long as the voltage $V_{cb}$ on the buffer capacitor $C_b$ exceeds a specific value. As a result of this, the power switches in the inverter circuit 19 remain under control as long as there is a voltage $V_{cb}$ which has such a value that it could damage the power switches in the event of failure of the control circuit PWM. Thus, safe and controlled braking remains possible after a supply voltage failure, the control circuit being energized by the energy supplied by the motor.

Transformer 21 further comprises a second secondary winding 24 in parallel with the series connection of a diode $D_{14}$ and capacitor $C_4$. The voltage pulses with an amplitude $V_{cb}$ across the primary winding 22 are transformed into a direct voltage $V_b$ across capacitor $C_4$. The direct voltage $V_b$, if the capacitor $C_4$ is not or is hardly loaded, is proportional to the voltage $V_{cb}$ across the capacitor $C_b$. This part of the circuit in accordance with FIG. 5 thus constitutes the circuit 12 of FIG. 1 for supplying a voltage $V_b$ which is a measure of the voltage $V_{cb}$.

The voltage $V_b$ at point 111 is applied to a comparator K, to which moreover a reference voltage $V_{R7}$ is applied. The output of the comparator K is coupled to a switch $S_3$, for example with the aid of a relay, in order to close said switch when the voltage $V_b$ exceeds the reference voltage $V_{R7}$. The switch $S_3$ is moreover shunted by a resistor $R_{25}$ having a positive temperature coefficient.

When mains the AC supply voltage is applied to the supply voltage terminals R, S and T, the buffer capacitor $C_b$ is charged by a large charging current. In order to protect the rectifier diodes this current is limited by resistor $R_{25}$. The circuit is moreover protected against short-circuiting during switching on in that a possible short-circuiting current heats the resistor $R_{25}$, so that the resistance value of this resistor $R_{25}$ increases considerably. If the voltage $V_{cb}$ across the buffer capacitor has reached a value which is defined by the reference voltage $V_{R7}$, at which value the charging current is sufficiently small and the voltage $V_{cb}$ is sufficiently high to enable the motor control circuit to be powered via the direct-voltage converter, the resistor $R_{25}$ is short-circuited by switch $S_3$ via comparator K.

FIG. 5 also shows an example of the detector which is designated 13 in FIG. 1. This circuit comprises the diodes $D_{15}$, $D_{16}$ and $D_{17}$, which together with the diodes $D_{10}$, $D_{11}$ and $D_{12}$ constitue a rectifier bridge. Parallel to said bridge rectifier a resistor $R_{26}$ and a capacitor $C_n$ have been included for smoothing the rectified voltage. The voltage $V_n$ across said capacitor is then the rectified supply voltage which, unlike the voltage $V_{cb}$, does not increase during generator operation.

As the diodes $D_{10}$, $D_{11}$ and $D_{12}$ are common to the two bridge rectifiers, the two capacitors $C_b$ and $C_n$ are d.c. coupled on one side. Between the other electrodes of said capacitors $C_b$ and $C_n$ a voltage divider with resistors $R_{27}$ and $R_{28}$ is included, which attenuates the difference between the voltage $V_{cb}$ and $V_n$ and applies it to the base-emitter junction of a transistor T, whose collector is connected to a positive supply voltage via a resistor $R_{29}$.

If during generator operation the voltage $V_{cb}$ increases, transistor T is turned on at an increase which is determined by the voltage divider $R_{27}$, $R_{28}$. The resulting voltage variation across the collector resistor $R_{29}$ is an indication of generator operation and may for example actuate the switch $S_2$ (FIG. 1) via an optical coupling for d.c. isolation and via logic gates. In this way a simple detection for generator operation is obtained which is independent of supply voltage variations.

The pulse width modulator (PWM) described in the said U.S. Pat. No. 4,189,669 has an input 26 (FIG. 1) for a clock signal in order to enable the relative pulse width to be controlled.

FIG. 6 shows a circuit for this purpose. This circuit comprises an input terminal 29 for a control voltage $V_{R9}$, which terminal is connected to the inverting input of an operational amplifier $A_{11}$ having adjusting resistors $R_{37}$ and $R_{38}$, an output of said amplifier leading to a voltage control oscillator 22 which supplies a clock signal whose frequency is determined by the signal $V_{R9}$.

At low motor speeds and comparatively high motor currents the available motor torque is substantially reduced owing to voltage losses across the motor impedance. These losses can be compensated for by reducing the frequency of oscillator 22, which means an increase of the relative pulse width. This compensation, also called IR-compensation, is for example possible by applying a compensation voltage $V_{x1}$, which is negative in the present example, to the input of amplifier $A_{11}$.

For this purpose the circuit comprises an operational amplifier $A_{10}$ with adjusting resistor $R_{31}$, whose inverting input is connected, via summing resistors $R_{290}$ and $R_{30}$ respectively, to a point at a positive reference voltage $V_{R8}$ and to point 8 of a circuit of FIG. 1 respectively. The point 8 carries the negative voltage $V_o$ whose amplitude is proportional to the desired speed. The output 27 of amplifier $A_{10}$ is connected to point 260 via resistor $R_{32}$, at which point 260 the compensation voltage $V_{x1}$ is available. This point 260 is connected to the inverting input of amplifier $A_{11}$ via the cathode-anode path of a diode $D_{19}$. Furthermore the circuit of FIG. 6 comprises an operational amplifier $A_9$ with adjusting resistor $R_{35}$, whose inverting input, via summing resistors $R_{33}$ and $R_{34}$ is connected to a point of negative reference voltage $V_{R10}$ and to a point 10 of the circuit of FIG. 1 respectively, at which point 10 a voltage $V_c$ appears which is proportional to the motor current $I_m$. The output 28 of amplifier $A_9$, at which a voltage $V_B$ is available, is connected to point 260 via the anode-cathode path of diode $D_{18}$.

The operation of the compensation in the circuit of FIG. 6 will be discussed with reference to FIG. 7 in which the compensation voltage $X_{x1}$ is plotted along the vertical axis and the speed n along the horizontal axis.

If the voltage $V_B$ is sufficiently negative ($V_B<V_A$) the voltage $V_{x1}$ corresponds to the voltage $V_A$, which is a linear function of the speed n. This is the line A in FIG. 7. Since at a specific speed the voltage $V_{x1}$ is always greater than or equal to the voltage $V_A$, $V_{x1}$ in the area to the left of line A is determined by the voltage $V_B$ (diode $D_{18}$ then conducts). This voltage $V_B$ is a linear function of the motor current and is proportional to the speed at low revolution numbers. The voltage $V_{x1}$ thus also limited by the motor current at low speed. This the line B in FIG. 7. Between the lines A and B the voltage $V_{x1}$ is determined by the motor current. The compensation voltage $V_{x1}$ can be limited at comparatively large motor currents by for example selecting the values of the resistors $R_{33}$, $R_{34}$ and $R_{35}$ and the reference voltage $V_{R10}$ so that amplifier $A_9$ is bottomed at for example a motor current which is ⅔ of the nominal motor current. This is the line C in FIG. 7. In addition it may be assumed that compensation is not necessary at comparatively small motor currents. By a suitable choice of the reference voltage $V_{R10}$ and the values of resistors $R_{33}$, $R_{34}$ and $R_{35}$ the value of the motor current below which no compensation is required can be selected so that at this value of the motor current the voltage $V_B$ is zero volts. This is because $V_{x1}$ will then be greater than or equal to zero volts and diode $D_{19}$ will cut off. The area in which IR compensation is used is shown hatched in FIG. 7 and is bounded by the lines A, B and C and the horizontal $V_{x1}=0$ axis. Thus, a simple and satisfactory IR-compensation is obtained.

A practical embodiment of the circuit in accordance with FIGS. 1 and 5 has been realized with components of the following values:

$R_1$—33 k$\Omega$
$R_2, R_3$—1 k$\Omega$
$R_4$—1.5 k$\Omega$
$R_5$—570 k$\Omega$
$R_6$—27.6 k$\Omega$
$R_7, R_8, R_9, R_{10}$—10 k$\Omega$
$R_{11}$—100 k$\Omega$
$R_{12}$—56 k$\Omega$
$R_{13}$—100 k$\Omega$
$R_{14}$—22 k$\Omega$
$R_{15}$—82 k$\Omega$
$R_{16}$—56 k$\Omega$
$R_{20}$—47 k$\Omega$
$R_{19}$—1 M$\Omega$
$R_{18}$—33 k$\Omega$
$R_{17}$—43 k$\Omega$
$R_{39}$—47 k$\Omega$
$R_{40}$—22 k$\Omega$
$R_{26}$—94 k$\Omega$
$R_{27}$—47 k$\Omega$
$R_{28}$—220 k$\Omega$
$R_{29}$—1.8 k$\Omega$
$C_b$—64 $\mu$F
$C_n$—2000 $\mu$F
$C_1$—22 $\mu$F
$A_1$ to $A_7$—TDA 0741
$V_{R1}$—$-12$ V to $+12$ V adjustable
$V_{R2}, V_{R5}, V_{R6}$—0 V to $+12$ V adjustable
$V_{R3}, V_{R4}$—0 V to $+12$ V adjustable The invention is not limited to the examples shown. Many variants are possible to the examples given for the current and voltage feedback loops and the various detection means.

What is claimed is:

1. A motor control circuit for an a.c. motor energized from a source of direct voltage via power switches comprising, a direct voltage source including a rectifier for rectifying an a.c. supply voltage and a smoothing circuit, a frequency control circuit comprising a frequency reference signal input connected to an input of a first amplifier having means for limiting the output signal, means connecting an output of said first amplifier to an input of an integrator, an output of said integrator supplying a frequency control signal to a circuit which controls the power switches and further providing feedback to the input of the first amplifier, a negative current-feedback loop comprising first means for generating a motor current signal which is a measure of the current flowing in the motor and a first comparator for comparing said motor current signal with a reference signal, means connecting an output of said first comparator to the input of the integrator so that the negative current-feedback loop is closed via the first comparator and the integrator when the motor current exceeds a predetermined value, a negative-voltage feedback loop comprising second means for generating a voltage signal which is a measure of the voltage across the direct voltage source and a second comparator for comparing said voltage signal with a reference signal, and means connecting an output of said second comparator to the integrator so that the negative voltage-feedback loop is closed via the second comparator and the integrator when the voltage of the direct voltage source exceeds a predetermined value.

2. A motor control circuit as claimed in claim 1 wherein the output of the second comparator is connected to the first integrator via the first comparator so that when the negative voltage-feedback loop is closed the negative current-feedback loop is also closed.

3. A motor control circuit as claimed in claims 1 or 2, further comprising detection means for detecting whether the a.c. motor operates as a generator or as a motor, a third comparator having an input coupled to said first signal generating means, and switching means coupled between an output of the third comparator and the input of the integrator and between the output of the comparator and the input of the first integrator, said switching means being controlled by said detection means so that during generator operation the output of the first comparator is connected to the integrator, and during motor operation the output of the third comparator is connected to the integrator.

4. A motor control circuit as claimed in claim 3 wherein the detection means comprises a second rectifier with a smoothing circuit and a comparator for comparing the direct voltage obtained from the second rectifier with the voltage of said direct voltage source and supplying a signal which indicates whether the voltage of the direct voltage source exceeds or does not exceed by a predetermined value the direct voltage obtained via the second rectifier.

5. A motor control circuit as claimed in claims 1 or 2 wherein the a.c. supply voltage comprises a three phase supply source and said first signal generating means includes a rectifying transformer having a primary winding in each phase supply line of the a.c. motor and having secondary windings connected in parallel to supply said motor current signal via a smoothing filter.

6. A motor control circuit as claimed in claims 1 or 2 further comprising a switchable direct voltage converter connected to the direct voltage source and having a transformer whose primary is in series with a switch and is connected in parallel with the direct voltage source, said transformer having a first secondary winding coupled to a rectifier circuit for supplying a supply voltage to the frequency control circuit.

7. A motor control circuit as claimed in claim 6 wherein said second signal generating means comprise a second secondary winding of the transformer connected to a rectifier circuit for supplying said voltage signal.

8. A motor control circuit as claimed in claims 1 or 2 wherein said second signal generating means are connected to a further comparator for comparing said voltage signal with a reference signal, means coupling an output of said further comparator to a switch connected between the rectifier of the direct voltage source and the smoothing circuit of the direct voltage source for closing said switch when the voltage signal exceeds said reference signal, and means connecting said switch in parallel with a resistor having a positive temperature coefficient.

* * * * *